US012503224B2

(12) United States Patent
Geiger et al.

(10) Patent No.: US 12,503,224 B2
(45) Date of Patent: Dec. 23, 2025

(54) THRUST CONTROL FOR GROUND NAVIGATION OF AERIAL VEHICLES

(71) Applicant: Lockheed Martin Corporation, Bethesda, MD (US)

(72) Inventors: Derek H. Geiger, Wilton, CT (US); William C. Fell, Stuart, FL (US); Alex Faynberg, Cheshire, CT (US); Stephen T. Kubik, Newtown, FL (US); Aaron Joshua Fradkin, Milford, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 139 days.

(21) Appl. No.: 18/406,971

(22) Filed: Jan. 8, 2024

(65) Prior Publication Data
US 2025/0223031 A1    Jul. 10, 2025

(51) Int. Cl.
*B64C 27/57*  (2006.01)
*G01P 5/00*   (2006.01)
*G05D 1/437*  (2024.01)
*G05D 1/495*  (2024.01)

(52) U.S. Cl.
CPC ............... *B64C 27/57* (2013.01); *G01P 5/00* (2013.01); *G05D 1/437* (2024.01); *G05D 1/495* (2024.01)

(58) Field of Classification Search
CPC ........... B64C 27/57; B64C 13/16; G01P 5/00; G05D 1/437; G05D 1/495; B64D 45/04
See application file for complete search history.

(56) References Cited

U.S. PATENT DOCUMENTS

| | | |
|---|---|---|
| 3,724,786 A | 4/1973 | Adams et al. |
| 9,969,488 B2 | 5/2018 | White et al. |
| 10,625,876 B2 | 4/2020 | Bosworth |
| 11,263,912 B2 | 3/2022 | Davis et al. |
| 11,718,393 B2 | 8/2023 | Bellera et al. |
| 11,794,884 B1 | 10/2023 | Hinman et al. |
| 2014/0070048 A1 | 3/2014 | Dequin |
| 2016/0327958 A1 | 11/2016 | Vallart et al. |
| 2019/0161181 A1 | 5/2019 | Alfred et al. |
| 2023/0025868 A1 | 1/2023 | Beaucamp et al. |

FOREIGN PATENT DOCUMENTS

NO          143736 B   * 12/1980    ............. B64C 25/00

OTHER PUBLICATIONS

Extended European Search Report on European Patent Application No. 24218544.5 dated Apr. 3, 2025 (11 pages).

* cited by examiner

*Primary Examiner* — Michael J Zanelli
(74) *Attorney, Agent, or Firm* — Foley & Lardner LLP

(57) ABSTRACT

Aerial navigation is disclosed. A system can detect a difference between forces applied to a plurality of ground contact points of an aerial vehicle taxiing on a ground surface. The system can determine an adjustment to a vertical component of a thrust. The thrust can be produced by at least one of a rotor or a propeller of the aerial vehicle to reduce the difference between the forces applied to the plurality of ground contact points of the aerial vehicle. The system can generate a control output to cause the at least one of the rotor or the propeller to adjust the vertical component of the thrust to reduce the difference between the forces.

19 Claims, 5 Drawing Sheets

THRUST CONTROL FOR GROUND NAVIGATION OF AERIAL VEHICLES

FIELD OF THE DISCLOSURE

This disclosure relates to sensor-based navigation of aerial vehicles.

BACKGROUND

Aerial vehicles, such as helicopters, can taxi along the ground, using one or more propulsive devices employed for aerial navigation. During taxiing operations, a lift-off of the aerial vehicle may be counter-indicated. However, errant control inputs or environmental conditions can cause such lift-offs.

SUMMARY

This technical solution is directed to ground taxiing control for aerial vehicles such as helicopters. The aerial vehicles can taxi on one or more skids, wheels, pontoons, or other contact points. An aerial vehicle can include a rotor or a propeller configured to generate vertical or horizontal thrust (e.g., upward thrust to lift-off or lateral thrust to directionally control the aerial vehicle). For example, in a grounded aircraft, a rotor can generate substantially vertical thrust to generate lift, and a propeller can generate substantially horizontal thrust to laterally propel the aerial vehicle. The vertical or horizontal components of the thrust can be adjusted according to one or more control signals configured to adjust vehicle operation such as via a swashplate, a rotor speed or pitch (e.g., according to a collective control), or an attitude of the aircraft.

A human pilot or autonomy system can maneuver the aerial vehicle. However, changing wind conditions or control adjustments can unintentionally generate excess thrust. Moreover, some controls may lack fine grain control, or may be cumbersome to operate manually. Some control inputs can unintentionally cause the aircraft to lift-off. In some instances, a lift-off can be unstable, causing the aircraft to return to the ground abruptly, incurring a loading cycle on the landing gear, or otherwise cause undesired motion.

A data processing system can separate an input of pilot controls from the outputs generated thereby. For example, the data processing system can enforce control laws to maintain aircraft stability. The control laws can be based on one or more sensors. For example, the aircraft contact points can interface with force sensors to determine a loading thereof. The data processing system can determine a difference (e.g., imbalance) between a loading of various contact points. Based on the difference, the data processing system can adjust a component of thrust of the rotor or propeller to reduce the difference. The data processing system can compare the loadings to one or more thresholds associated with taxiing (e.g., an upper or lower limit), and adjust a component to maintain the aircraft in contact with the ground. In some instances, the data processing system can identify indicia of intentionality of an input, such as based on a magnitude of a change configured to cause lift-off (e.g., a pilot can abruptly cause command lift-off in response to observing foreign objects or debris (FOD) on a taxiway). The control system can determine that the input is a command to lift-off, and cause the aerial vehicle to lift-off, such as by reducing an adjustment of the component of the thrust.

An aspect of the present disclosure can relate to a system. The system can include one or more processors coupled to memory. The system can detect a difference between forces applied to ground contact points of an aerial vehicle taxiing on a ground surface. The system can determine an adjustment to a vertical component of a thrust produced by at least one of a rotor or a propeller of the aerial vehicle to reduce the difference between the forces applied to the ground contact points of the aerial vehicle. The system can generate a control output to cause at least one of the rotor or the propeller to adjust the vertical component of the thrust to reduce the difference between the forces.

In some implementations, the system includes a sensor configured to measure a force for each of the ground contact points. The system can detect the difference between the forces applied to the ground contact points based on the sensor measurements. In some implementations, the system includes a wind speed sensor to determine a windspeed. The one or more processors can determine the control output based on the wind speed. In some implementations, the system can receive a control input corresponding to at least one of the rotor or the propeller. The system can generate the control output based on the control input. In some implementations, the one or more processors can receive a control input corresponding to at least one of the rotor or the propeller. The system can determine an instruction or command to lift-off based on the control input. The system can generate, responsive to the determination of the instruction or command to lift-off, the control output to cause the aerial vehicle to lift-off.

In some implementations, the one or more processors can receive a control input corresponding to at least one of the rotor or the propeller. The control input can include a wheel-brake engagement command to brake a wheel of one or more of the ground contact points. The one or more processors can generate the control output responsive to the receipt of the wheel-brake engagement command. The control output can adjust a velocity reference or an acceleration reference. In some implementations, the one or more processors can determine an adjustment to a horizontal component of the thrust produced by at least one of the rotor or the propeller of the aerial vehicle. The adjustment can reduce a difference between a velocity of the aerial vehicle and a velocity reference, or an acceleration of the aerial vehicle and an acceleration reference. In some implementations, the one or more processors can generate a control output. The control output can include a first control signal for the rotor and a second control signal for the propeller. In some implementations, the one or more processors can generate a control output. The control output can include a first control signal configured to actuate a first effector for a first rotational airfoil. The control output can include a second control signal configured to actuate a second effector for a second rotational airfoil. The first rotational airfoil or second rotational airfoil can be or include the propeller or the rotor.

An aspect of the present disclosure can relate to a method. The method can be performed by one or more processors coupled to memory. The method can include detecting a difference between forces applied to ground contact points of an aerial vehicle taxiing on a ground surface. The method can include determining an adjustment to a vertical component of a thrust produced by at least one of a rotor or a propeller of the aerial vehicle to reduce the difference between the forces applied to the plurality of ground contact points of the aerial vehicle. The method can include generating a control output to cause the at least one of the rotor or the propeller to adjust the vertical component of the thrust to reduce the difference between the forces.

In some implementations, the method includes receiving a control input corresponding to at least one of the rotor or the propeller. The control input can include a velocity reference or an acceleration reference. The method can include generating the control output based on the control input. In some implementations, the method includes receiving, from an autonomous flight control system, a control input corresponding to at least one of the rotor or the propeller. The method can include generating the control output based on the control input. In some implementations, the method includes receiving, from a human-machine interface of the aerial vehicle, a control input corresponding to at least one of the rotor or the propeller. The method can include generating the control output based on the control input.

In some implementations, the method includes receiving a control input corresponding to at least one of the rotor or the propeller. The method can include determining that the control input is indicative of an instruction or command to lift-off. The method can include generating the control output to cause the aerial vehicle to lift-off, responsive to the determination that the control input is indicative of the instruction or command to lift-off. In some implementations, the method includes receiving a control input corresponding to at least one of the rotor or the propeller. The control input can include a wheel-brake engagement command to brake a wheel of one or more of the ground contact points. The method can include generating the control output based on the control input and responsive to the receipt of the wheel-brake engagement command. The control output can adjust a velocity reference or an acceleration reference.

An aspect of the present disclosure can relate to an aerial vehicle. The aerial vehicle can include a computing system comprising one or more processors, coupled with memory. The aerial vehicle can include ground contact points. The aerial vehicle can include at least one of a rotor or a propeller configured to generate a thrust. The one or more processors can detect a difference between forces applied to the ground contact points of the aerial vehicle taxiing on a ground surface. The one or more processors can determine an adjustment to a vertical component of the thrust to reduce the difference between the forces applied to the ground contact points of the aerial vehicle. The one or more processors can generate a control output to cause the at least one of the rotor or the propeller to adjust the vertical component of the thrust to reduce the difference between the forces.

In some implementations, the one or more processors can receive a control input corresponding to at least one of the rotor or the propeller. The one or more processors can generate the control output based on the control input. In some implementations, the one or more processors can receive a control input comprising a velocity reference or an acceleration reference. The one or more processors can generate the control output based on the control input. In some implementations, the aerial vehicle includes a wind speed sensor configured to determine a wind speed. The one or more processors can determine the control output based on the wind speed.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined, and it will be readily appreciated that features described in the context of one aspect of the invention can be combined with other aspects. Aspects can be implemented in any convenient form. For example, by appropriate computer programs, which can be carried on appropriate carrier media (computer readable media), which can be tangible carrier media (e.g., disks or other non-transitory storage media) or intangible carrier media (e.g. communication signals). Aspects can also be implemented using suitable apparatus, which can take the form of programmable computers running computer programs arranged to implement the aspects. As used in the specification and in the claims, the singular form of "a," "an," and "the" include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1:
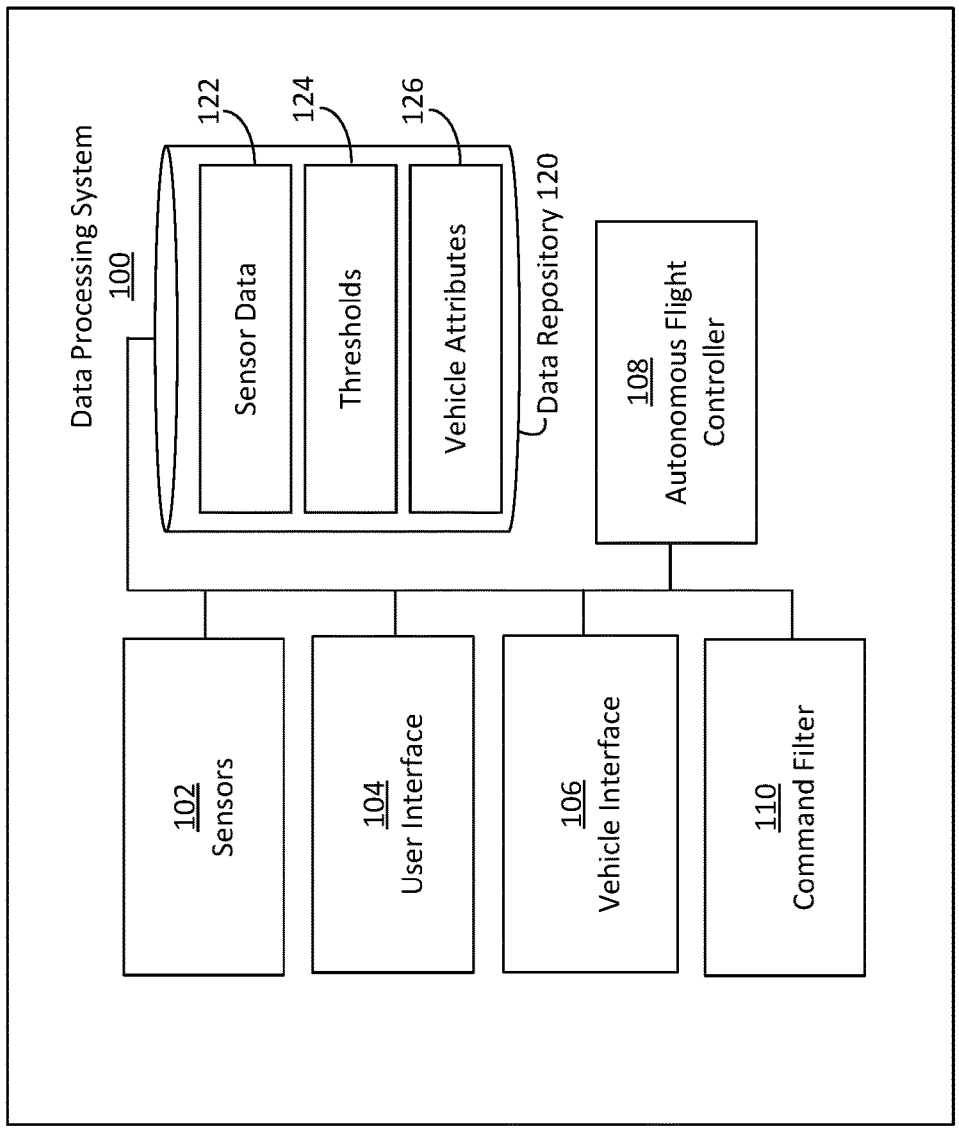
FIG. 1 illustrates a block diagram of an example data processing system, in accordance with one or more implementations.

In the following detailed description, reference is made to the accompanying drawings, which form a part thereof. In the drawings, similar symbols typically identify similar components, unless context indicates otherwise. The illustrative implementations described in the detailed description, drawings, and claims are not meant to be limiting. Other implementations can be utilized, and other changes can be made, without departing from the spirit or scope of the subject matter presented. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The systems, apparatuses, and methods described herein allow for an application of control laws associated with various control surfaces of an aerial vehicle. The control laws can be configured to maintain the aerial vehicle in a taxiing (e.g., grounded) configuration. A data processing system can receive inputs which, if mapped to unadjusted control outputs, could cause at least a portion of the aerial vehicle to lift-off. The data processing system can receive sensor inputs from sensors related to a force distribution between various contact points between the aerial vehicle and the ground, or relating to a wind speed or other environmental conditions. The data processing system can generate control outputs based on the control inputs and sensor data from the sensors. For example, the control outputs can include adjustments to the control inputs, the adjustments configured to prevent aerial vehicle lift-off. The data processing system can detect an input indicative of a cessation of taxiing (e.g., an intentional lift-off command), and generate control outputs to cause the commanded lift-off.

Referring now to FIG. 1, illustrated is a block diagram of an example data processing system 100, in accordance with one or more implementations. The data processing system 100 can include or interface with various sensors 102. The data processing system 100 can include or interface with at least one user interface 104 configured to receive inputs from a pilot of an aerial vehicle. The data processing system 100 can include at least one vehicle interface 106 operatively coupled with various effectors for an aircraft, such as effectors for control surfaces or thrust generating elements (e.g., rotating airfoils such as rotors or propellers). The data processing system 100 can include at least one autonomous flight controller 108. The data processing system 100 can include at least one command filter 110 to filter control inputs received from the user interface 104. The data processing system 100 can include at least one data repository 120.

The sensors 102, user interface 104, vehicle interface 106, autonomous flight controller 108, or command filter 110 can each include a processing unit or other logic device such as programmable logic array engine or module configured to communicate with the data repository 120 or database. The sensors 102, user interface 104, vehicle interface 106, autonomous flight controller 108, or command filter 110 can be separate components, a single component, or part of the data processing system 100. The data processing system 100 can include hardware elements, such as one or more processors, logic devices, or circuits. For example, the data processing system 100 can include one or more components, structures or functionality of a computing device depicted in FIG. 5.

The data repository 120 can include one or more local or distributed databases, and can include a database management system. The data repository 120 can include computer data storage or memory and can store one or more of sensor data 122, thresholds 124, or vehicle attributes 126. The sensor data 122 can refer to or include current or historical information from one or more sensors 102. For example, the sensor data 122 can include a force sensed at one or more ground contact points of the aerial vehicle, a windspeed, or other sensors 102 associated with the aerial vehicle such as a speed sensor 102 (e.g., an inertial sensor 102 or global navigation satellite system (GNSS). The sensor data 122 can include a most recent sensor reading, maximum or minimum sensor values (e.g., of windspeeds), or smoothed (e.g., time-averaged) values of sensor data 122, which the data processing system can employ to apply a low pass filer to aircraft controls. A most recent receipt of sensor data 122 can be referred to as current or instantaneous sensor data 122; other sensor data 122 can be referred to as historic sensor data 122. For example a most recent force measurement corresponding to a ground contact point or windspeed can be referred to as current sensor data 122. A maximum wind gust, or time-averaged force at a contact point can be referred to as historical sensor data 122.

The thresholds 124 can define an upper or lower bound (e.g., a range) of various aspects of aerial vehicle operations. As used herein, a threshold 124 may refer to a threshold 124 for current or historical data. For example, a first threshold 124 can prevent the aerial vehicle from lifting off, and a second threshold 124 can reduce force differentials between ground contact points, such that a number of adjustments to control inputs can be reduced via time-averaging the control signals when a ground contact point does not meet or approach a zero-force condition associated with lift-off (e.g., data smoothing can reduce a number of adjustments). The vehicle attributes 126 can refer to information corresponding to the aerial vehicle, such as a unloaded weight, a weight of cargo, personnel, or equipment, a threshold 124 for force applied to ground contact point, or a predetermined distribution of forces applied to the various ground contact points (e.g., a suspension geometry). The vehicle attributes 126 can include an indications of a relationship (e.g., maps) between any control input and any control output. For example, a throttle position or blade pitch can map to a change in thrust, or an application of wheel-braking can map to a change in taxiing speed of the aerial vehicle. The data processing system can determine an adjustment based on the indications of the relationships.

The data processing system 100 can include sensors 102 designed, constructed, or operational to generate sensor data 122 associated with ground handling characteristics of an aerial vehicle. The sensors 102 can include force sensors 102 configured to determine a force applied to one or more contact points between the aerial vehicle and a ground surface of a taxiway such as a runway, field, water surface, or ship deck. For example, the force sensors 102 can include strain gauges configured to detect a strain of a ground contact point based on a force applied thereto. The strain gauge can include an electric strain gauge configured to detect a change in a resistance of a conductive element responsive to a force between the ground surface and the aerial vehicle. The strain gauge can include an optical strain gauge configured to detect changes to the propagation of light through a fiber responsive to a force between the ground surface and the aerial vehicle. Various load cells, piezoelectric sensors 102, hydraulic load detectors, or other sensors 102 can generate an indication (e.g., measurement) of a force between the ground surface and the aerial vehicle, such as a force distributed across various contact points. Any of the contact points can include a sensor 102, such that a portion of force between the ground surface and the aerial vehicle can be attributed to a ground contact point. The ground contact points can include, for example, skids, wheels, floats or pontoons.

Based on the multiple sensors 102 for the various contact points, the data processing system 100 can determine a difference between the forces applied to each of the ground contact points of the aerial vehicle during a taxiing operation. The differences can be based on any number of contact points in contact with the ground. For example, the aerial vehicle can include a rear-left ground contact point, rear-right ground contact point, and front contact point. The aerial vehicle can taxi with any of the ground contact points in contact with the ground surface. For example, the aerial vehicle can taxi with the two rear ground contact points in contact with the ground surface, or all contact points in contact with the ground surface.

The data processing system 100 can, based on the sensor data 122, determine a force applied to each of the ground contact points. For example, a 30,000 pound aerial vehicle can apply 10,000 pounds of force to each of three contact points, or generate 15,000 pounds of vertical thrust and apply 5,000 pounds of force to each of the three contact points. The data processing system 100 can detect a difference between forces applied to the various ground contact points. For example, the data processing system can detect 8,000 pounds of force at a rear-left ground contact point and 2,000 pounds of force at a rear-right ground contact point, or detect differences along a longitudinal portion of the aircraft (e.g., between a front and rear landing gear or skid portions).

The sensors 102 can include environmental sensors 102 to determine other aspects of ground handling characteristics, such as to detect environmental conditions. For example, the environmental sensors 102 can include windspeed sensors 102 mechanically or operatively coupled with the aerial vehicle. The wind speed sensor 102 can determine a wind speed at or proximal to the aerial vehicle, which may be correlated with forces applied at the ground contact points. For example, the detection of a wind gust in combination with a detection of a force prior to the wind gust can indicate that a first portion of the difference is attributable to the thrust generated by aircraft propellers or rotors, and a second portion of the difference is attributable to the wind. The data processing system 100 can generate output signals based on the portion of the difference attributable to the wind. For example, the data processing system 100 can generate control signals based on the portion of the difference is attributable to the thrust generated by aircraft propellers or rotors alone, or discount the portion of the difference attributable to the wind (e.g., where 1000 pounds of the difference is attributable by the wind, the data processing system can generate control signals to reduce the difference by 500 pounds).

The sensors 102 described herein are not intended to be limiting. The sensors 102 can include further sensors 102 such as inertial sensors 102 (e.g., accelerometers) configured to detect an attitude of an aerial vehicle, such as a disposition of the vehicle over a gradient or slope. The data processing system 100 can employ such sensors 102 to offset the difference in force applied to the wheels, such as where the aerial vehicle is navigating a sloped ground surface of a taxiway.

The data processing system 100 can include at least one user interface 104 designed, constructed, or operational to receive control inputs. The user interface 104 can include a communicative connection with an autonomous flight controller 108 to receive control inputs therefrom. For example, the control input can correspond to one or more rotors or propellers of an aerial vehicle, such as to generate thrust to propel the aerial vehicle along a taxiway. The user interface 104 can include one or more inputs such as buttons (e.g., a keypad), touchscreens, levers, pedals, or hands on throttle-and-stick (HOTAS) controls, to receive input from a human pilot. Portions of the user interface 104 are sometimes referred as human-machine interfaces (HMI).

The user interface 104 can include controls corresponding to one or more rotational airfoils of the vehicle. For example, the user interface 104 can include one or more control inputs corresponding to a rotor or a propeller. For example, the control inputs can correspond to a control output for an effector to cause an adjustment to a speed, blade pitch, or other control. The control inputs can include fine grain control such as anti-torque pedals, a cyclic stick, or a collective lever which can be continually adjusted by a pilot. The control inputs can include a velocity or acceleration reference. For example, the control inputs can include a keypad (sometimes referred to as a beeper) or other device to enter a discrete indication of a vehicle velocity, a rotational airfoil velocity, or an acceleration reference of the vehicle or rotational airfoil. The received velocity reference or acceleration reference can correspond to the propeller or rotor. For example, the reference can be a reference for the propeller, wherein the rotor can be controlled via other control inputs. Some aerial vehicles (e.g., quadcopters) can include several instances of rotors or propellers. The user interface 104 can include collective or separate controls for the various instances of the rotational airfoils.

The user interface 104 can include controls corresponding to various control surfaces or other vehicle controls. For example, control inputs can correspond to a rotational airfoil (e.g., a rotor or propeller) or to a wheel-brake of a wheel of any of the ground contact points. The control inputs can include a wheel-brake engagement command to brake the wheel. The wheel-brake engagement can adjust forces between the various ground contact points (e.g., increasing weight on front ground contact points based on forward pitch from braking). Such indications of braking can be received by the user interface 104.

The data processing system 100 can include at least one vehicle interface 106 designed, constructed, or operational to determine and generate control outputs to navigate the aerial vehicle based on received control inputs and sensor data 122. A control output can include control signals to actuate various effectors for control surfaces such as aerodynamic control surfaces, brakes, or propulsive elements such as rotational airfoils. The vehicle interface 106 can determine a difference between forces applied to various ground contact points, receive a control input, and determine a control output based on the control input and the difference. For example, the control output can cause a rotational airfoil (e.g., a rotor or propeller) to adjust a thrust generated to reduce a difference between forces detected at the various ground contact points of the aerial vehicle. Differences between the forces applied can include a commanded difference, such as to maintain a lower loading on a front landing gear assembly, relative to rear landing gear assembly.

The vehicle interface 106 can determine an adjustment to a horizontal or vertical component of a thrust produced by a rotational airfoil to reduce the difference between the forces applied to the ground contact points of the aerial vehicle. The vehicle interface 106 can generate control outputs based on the control inputs (e.g., responsive to the receipt thereof). Such control inputs can include any of the inputs received by the user interface 104, such as inputs from a human pilot or autonomous flight controller 108, including, for example, inputs associated with any number of rotational airfoils, or a wheel-brake engagement command.

The control outputs can effect adjustments of various rotational airfoils. For example, the control outputs can include or generate control signals to cause a rotor or propeller to adjust a vertical or horizontal component of the thrust. The adjustment can include a directional adjustment (e.g., of a swashplate) to adjust an orientation of a rotor, or can adjust a blade pitch, speed, or other aspect of vehicle operation. The vehicle interface 106 can effect the adjustment based on a comparison to one or more thresholds 124. For example, the threshold 124 can include a lift-off threshold 124 (e.g., a zero-force condition, or an offset therefrom, such as 1000 pounds, 500 pounds, or so forth). The control output can include an adjustment to a velocity reference or an acceleration reference. For example, the control output can include a wheel brake engagement command (e.g., to reduce the velocity or acceleration to a zero or non-zero value, based on an adjusted velocity reference or acceleration reference). The control output can include an adjustment to a horizontal component of the thrust produced by a rotational airfoil. For example, the adjustment can reduce a difference between the velocity of the aerial vehicle and a velocity reference, or the acceleration of the aerial vehicle and an acceleration reference. The adjustment can include an acceleration of the aerial vehicle. For example, a thrust generated by a propeller can be adjusted by adjusting a speed, blade pitch, or other parameter of the blades thereof; a thrust generated by a rotor can be adjusted by adjusting a speed, blade pitch, or other parameter of the blades thereof; or a thrust generated by a rotor can be adjusted by adjusting an aircraft attitude or a longitudinal axis thereof (e.g., fore-ward to increase a velocity of the aircraft or aft-ward to reduce the velocity). Such an attitude can maintain the contact points on a ground surface, such as by adjusting an extension of an adaptive landing gear.

The data processing system 100 can include at least one autonomous flight controller 108 designed, constructed, or operational to execute a navigational action to adjust a position of the aerial vehicle. The autonomous flight controller 108 can include a trajectory follower having aircraft flight controls (e.g., throttle, anti-torque controls or a cyclic control). For example, the trajectory follower of the autonomous flight controller 108 can directly control the flight of the aerial vehicle (e.g., in an autonomous aerial vehicle) to navigate a route determined or received by the data processing system 100, according to a path determined by a local motion planner. According to some implementations, the autonomous flight controller 108 can provide control inputs corresponding to other control inputs received from the user interface 104. In some implementations, the autonomous flight controller 108 can cause an actuation of such controls. In some implementations, the autonomous flight controller 108 can provide a message to the vehicle interface 106 including an indication of a command corresponding to such controls. Like other components of the present disclosure, some vehicles can omit an autonomous flight controller 108, wherein navigational actions referred to with regard to the autonomous flight controller 108 can be received from a pilot.

The data processing system 100 can include at least one command filter 110 designed, constructed, or operational to distinguish between lift-off commands and other control signal inputs. For example, the command filter 110 can receive control inputs from a human or non-human pilot (e.g., the autonomous flight controller 108). The command filter 110 can determine that an unadjusted control output can cause the aircraft to lift-off, or reduce a force to a within a predetermined threshold 124 or range (e.g., a net force at a ground contact point which is not less than 500 pounds). The command filter 110 can determine that a command which can cause the vehicle to lift-off or otherwise reduce the force at a ground contact point to less than the predetermined threshold 124 is or is not a lift-off command. In some implementation, the threshold 124 can be dynamic such as to adjust based on environmental conditions. For example, the command filter 110 can determine that a command input corresponding to an unadjusted command output which would cause the aerial vehicle to lift-off, but which would not have caused the aircraft to lift-off based on a windspeed condition within a preceding time window can be determined to be unintentional. The command filter 110 can determine that a command input corresponding to an unadjusted command output which would cause the aerial vehicle to lift-off with excess thrust less than a predefined threshold 124 is not intentional command (e.g., a throttle input that maps to a control output to generate 30,100 pounds of thrust for a 30,000 pound vehicle indicates a pilot intent to remain taxiing on the ground; whereas another throttle input corresponding to 40,000 pounds of thrust can indicate an instruction or command to lift-off).

In some implementations, the command filter 110 can receive a discrete indication to lift-off or not to lift-off (e.g., a toggle switch, button press, or predefined message from an autonomous flight controller 108). The command filter 110 can discriminate between lift-off commands and other commands based on the discrete input. For example, the command filter 110 can map a command input to the status of the discrete input, or can adjust a threshold 124 based on the discrete indication. The command filter 110 can convey the determination of the instruction or command to lift-off (or remain taxiing) to the vehicle interface 106. Upon a receipt of such an indication, the vehicle interface 106 can generate control outputs to cause the aerial vehicle to lift-off or remain taxiing.

Figure 2:
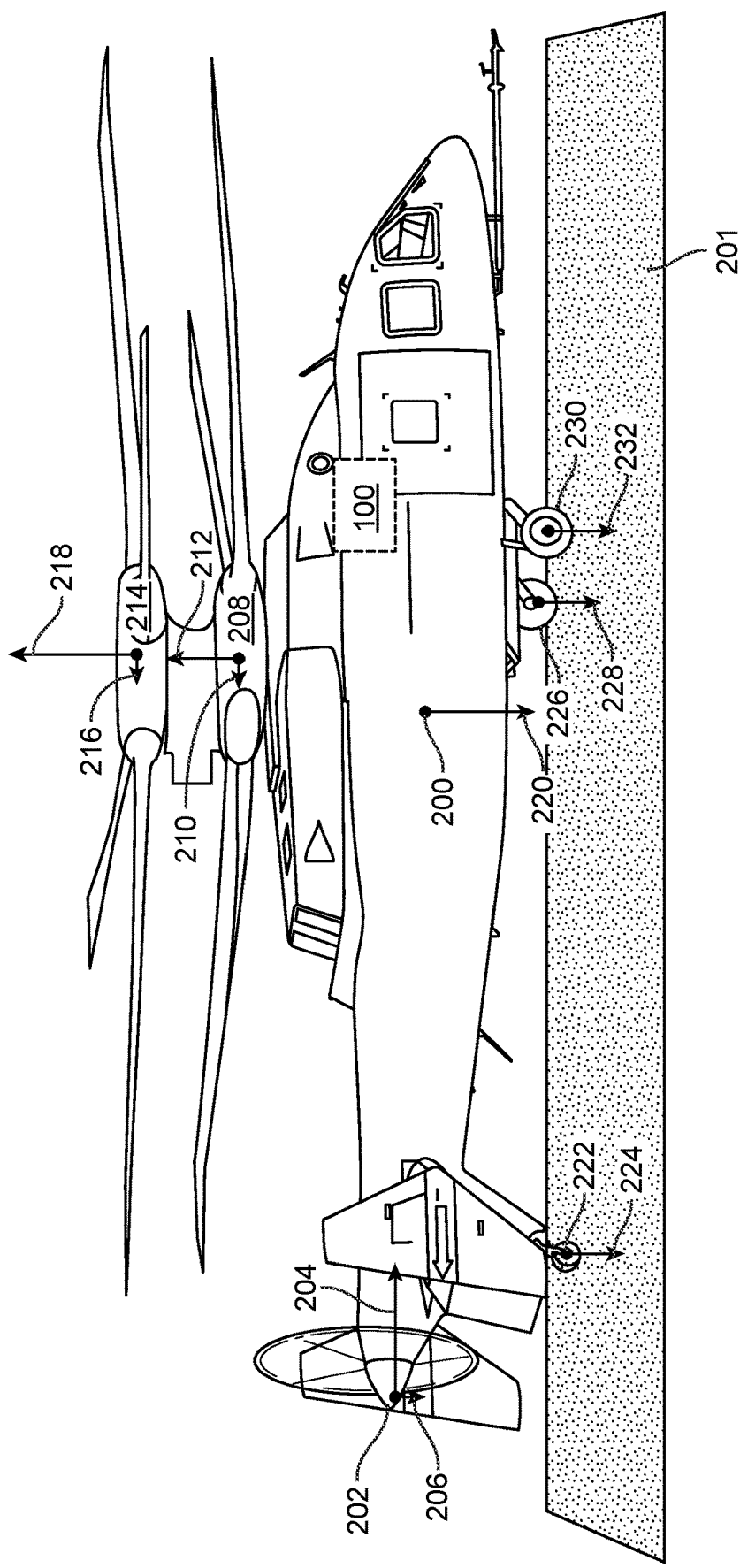
FIG. 2 illustrates an example of an aerial vehicle traversing a ground surface of a taxiway, in accordance with one or more implementations.

| FIG. 2 illustrates an example of an aerial vehicle 200 traversing a ground surface 201 of a taxiway, in accordance with one or more implementations. The aerial vehicle 200 can exert a downward force 220 based on a mass thereof, and interactions with the environment (e.g., wind forces transferred through the airframe of the aerial vehicle 200). The aerial vehicle 200 can include various propulsive elements such as the depicted rotational airfoils. For example, the aerial vehicle 200 can include a rear propeller 202. The propeller 202 can propel the aerial vehicle 200 with a horizontal (e.g., fore-ward) portion of a thrust 204 thereof. The propeller 202 can generate a vertical (e.g., upward or downward) portion of a thrust 206 thereof, such as based on an inclination or declination of the aerial vehicle 200 with respect to an environment, or the propeller with respect to the aerial vehicle 200. The aerial vehicle 200 can include a rotor, such as a substantially vertical rotor. For example, the aerial vehicle 200 can include a first rotor 208 and a second rotor 214 in a tandem rotor configuration. The first rotor 208 and second rotor 214 can generate respective first horizontal thrust 210 and second horizontal thrust 216 (e.g., fore-ward or rearward thrust), which is adjustable via one or more swashplates. The first rotor 208 and second rotor 214 can generate respective first vertical thrust 212 and second vertical thrust 218 (e.g., upward or downward). The total thrust of any of the rotational airfoils can be adjusted, such as according to a blade pitch or rotational speed. A proportion of the total thrust directed in a horizontal or vertical direction can be adjusted by adjusting a relative position of the rotational airfoil with respect to the chassis of the aircraft (e.g., via a swashplate adjustment), or a relative position of the aircraft with respect to the environment (e.g., an aerial vehicle attitude). References to adjusting a vertical or horizontal thrust can include changing a total thrust, or changing a proportion thereof directed in such a direction. References to adjusting an aircraft attitude can refer to maintaining at least a portion of the ground contact points in contact with the ground. For example, the aircraft attitude can change the attitude by absorbing a portion of suspension travel of a ground contact point.

A net of the vertical force imparted downward by the mass of the aerial vehicle 200 or environmental conditions and the thrust generated from the various propulsive elements thereof can be applied to a ground surface 201 via any number of contact points. For example, the ground contact points can include a first ground contact point 222 at the rear of the vehicle, transmitting a first force 224 to the ground surface 201, a second ground contact point 226 and third ground contact point 230, transmitting respective second force 228 and third force 232 to the ground surface 201. Sensors 102 of or coupled with the data processing system 100 can include sensors 102 mechanically coupled with the ground contact points to determine a force transmitted therethrough (e.g., an optical or electronic strain gauge sensor 102). Upon receipt of the various forces for the ground contact points, the data processing system 100 can determine a difference therebetween. The depicted forces are not intended to be limiting. For example, the ground contact points can exert horizontal forces, such as associated forces with a rolling resistance of a wheel or a lateral force applied to a braked wheel, a drag of a pontoon through an aqueous ground surface 201, or friction between a skid an a ground surface 201.

Various implementations of an aerial vehicle 200 can include various rotors or propellers. For example, some aerial vehicles 200 can include two or more rotors laterally spaced from one another (e.g., a first rotor 208 and second rotor 214 of a quadcopter), or a rotational airfoil which is rotatable about a transverse plane (e.g., to selectively operate in a substantially vertical or substantially horizontal configuration). In some implementations, the data processing system 100 can determine a difference in forces applied to contact points based on differing vertical forces, such as in the case of laterally spaced rotational airfoils exerting different vertical thrusts to generate a moment about the aerial vehicle 200 (e.g., a roll moment).

Figure 3:
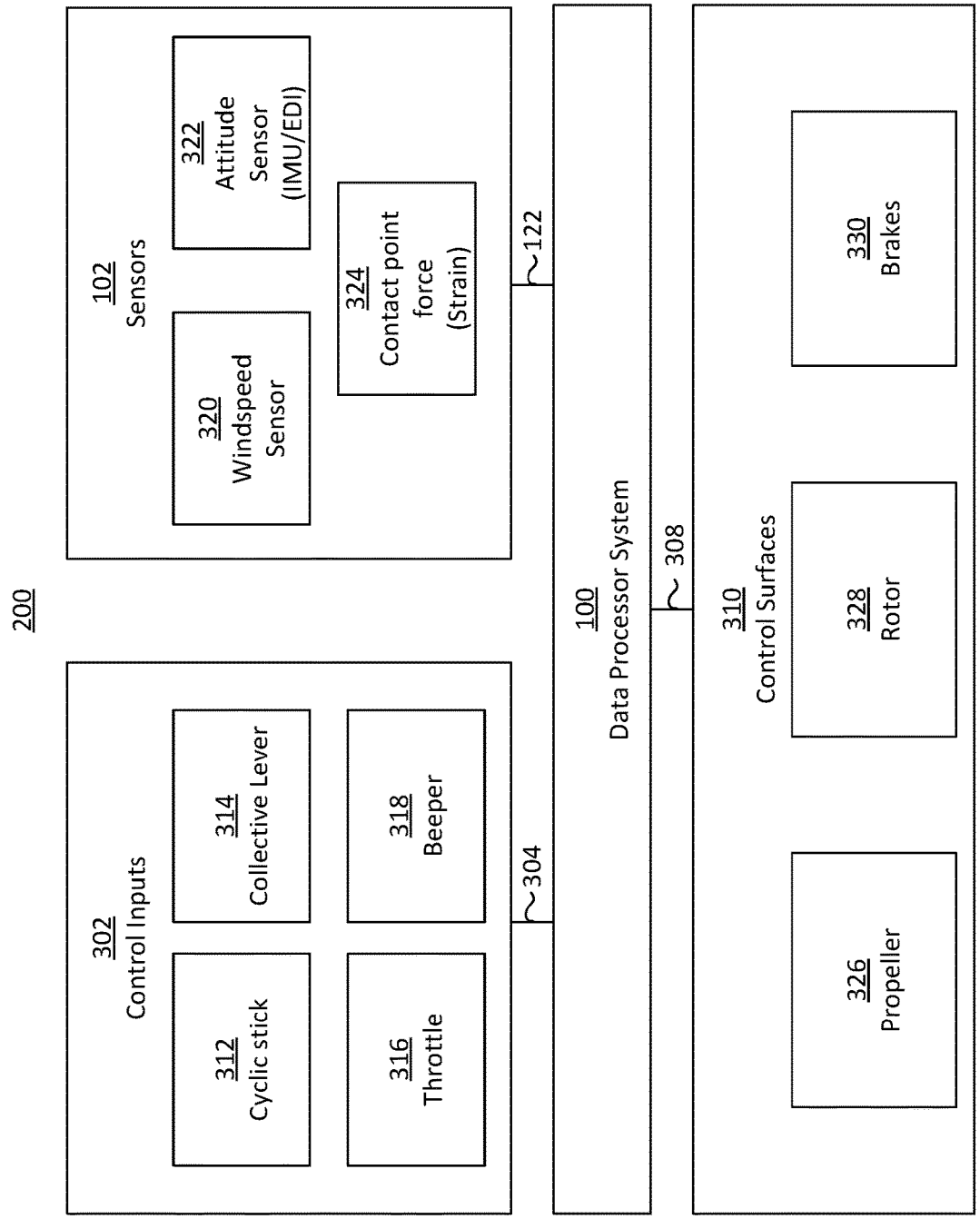
FIG. 3 illustrates an example data flow diagram of aerial vehicle operation, in accordance with one or more implementations.

FIG. 3 illustrates an example data flow diagram of aerial vehicle 200 operation, in accordance with one or more implementations. Various control inputs 302 received from components of the user interface 104 can be conveyed to the data processing system 100 as control input signals 304. Sensor data 122 can be received from various sensors 102 of, or operatively coupled with, the aerial vehicle 200. The data processing system 100 can generate control outputs 308 based on the control inputs 302 (e.g., the control input signals 304) and the sensor data 122. For example, the control outputs 308 can include adjusted or unadjusted outputs corresponding to the inputs. The unadjusted outputs can be mapped outputs corresponding to a position of the control inputs 302 (e.g., a rotor tilt mapped to the position of the cyclic stick 312). The adjusted outputs can vary from mapped outputs. For example, the adjusted outputs can differ from an unadjusted output to prevent the aerial vehicle 200 from lifting off the ground surface 201, or to cause the aerial vehicle 200 to lift-off the ground surface 201, based on a condition detected by the command filter 110. The control outputs 308 from the data processing system 100 can include control output signals to actuate effectors for control surfaces 310 such as a propeller 202, a rotor 328, or a brake 330 (e.g., a wheel-brake 330).

The various control inputs 302 can include inputs from a cyclic stick 312, collective lever 314, throttle 316, beeper 318, or other input, such as an input from an autonomous flight controller 108. The cyclic stick 312 can receive control inputs 302 from the pilot to control the pitch and roll by tilting the stick in the corresponding direction. A control output 308 associated with the input can alter the angle of the rotor blades for maneuvering the aerial vehicle 200. The collective lever 314 can receive control inputs 302 from the pilot to control the lift of the aerial vehicle 200 by actuating the lever. A control output 308 associated with the control input 302 can alter the angle of the rotor blades for increasing or decreasing lift. The throttle 316 can receive control inputs 302 from the pilot to control the power output of the aerial vehicle 200 according to a position thereof. A control output 308 associated with the input can alter the power generated by an engine or output to one or more rotational airfoils (e.g., the rotor 328). The beeper 318 can receive discrete control inputs 302 from the pilot to control the power output of the aerial vehicle 200. For example, the beeper 318 can receive an entry via a keypad or other selection of a reference speed or acceleration of a propeller of the aerial vehicle 200. The entry can correspond to a selected acceleration reference or velocity reference. A control output 308 associated with the input can alter the power output to one or more rotational airfoils (e.g., the propeller 202). Such an adjustment can, for example, adjust a reference based on an application of a brake 330, which may aid a pilot in responding to a condition whereas generating a new entry for the beeper 318 may otherwise require additional time or attention. The disclosed control inputs are not intended to be limiting. For example, a throttle pedal can receive a control inputs 302 from a pilot including a yaw-command. Various control inputs 302 can be combined, disaggregated, or otherwise distributed to various control outputs 308. For example, a propeller 326 can include a lateral control to provide yaw power which can combine (e.g., additive or subtractive combinations) with yaw power corresponding to a differential torque between two or more rotor shafts.

The sensors 102 can include, for example, a windspeed sensor 320, attitude sensors 322 (e.g., an inertial measurement unit (IMU) or other data source for an electronic display indicator (EDI)), or contact point force sensors 324 (e.g., strain gauges). The data processing system 100 can receive sensor data 122 from the various sensors 102. The data processing system 100 can receive or store the sensor data 122 whereupon the data processing system 100 can generate control outputs 308 based on current or historical sensor data 122.

The data processing system 100 can generate control outputs 308 for the control of various control surfaces 310 of the vehicle. For example, the control outputs 308 can include control signals for effectors of the various control surfaces 310. The control surfaces 310 can include aerodynamic control surfaces 310, or other control surfaces 310, such as wheel-brakes 330. The control outputs 308 can be determined based on the control inputs 302 and the sensor data 122. For example, the control inputs 302 can map to unadjusted control outputs 308. The data processing system can determine that the unadjusted control outputs 308 can be adjusted. For example, the determination can be based on a difference in forces between ground contact points, or an absolute value of one or more such forces (e.g., indicative of lift-off of at least one ground contact point) The data processing system 100 can generate the determination based on the receipt of the sensor data 122. The data processing system 100 (e.g., the vehicle interface 106) can adjust the corresponding control output 308 to prevent or cause a lift-off of the aerial vehicle 200, or to reduce a difference between ground contact points of the aerial vehicle 200.

Figure 4:
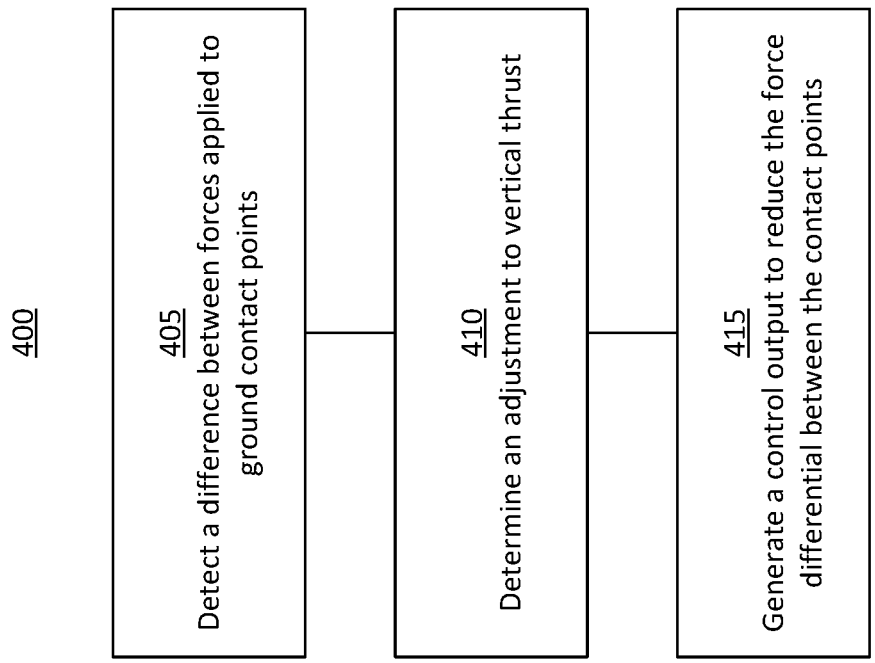
FIG. 4 illustrates an example flow diagram of a method of aircraft taxiing, in accordance with one or more implementations.

FIG. 4 illustrates an example flow diagram of a method 400 of aircraft taxiing, in accordance with one or more implementations. The flow diagram depicts ACTs associated with the method 400. The method 400 can be executed, performed, or otherwise carried out by a data processing system 100, which can include one or more processors or other elements of the computer system 500 described herein in conjunction with FIG. 5, or any other computing devices.

At ACT 405 the method 400 can include a detection, by the data processing system 100, of a difference between forces applied to ground contact points. The detection can be at a data processing system 100 responsive to sensor data 122 from one or more force sensors 102, such as strain gauges mechanically coupled to the ground contact points.

The difference can be determined between any ground contact points, such as to determine a maximum difference between contact points or a difference between various ground contact points. The differences can be an absolute difference, or a difference from an offset. For example, the data processing system 100 can include vehicle attributes 126 associating ground contact points with non-equal forces (e.g., a rear wheel can be configured to support lesser weight than a front wheel). In some implementations, the difference between the forces is a time-average (e.g., over a trailing widow, such as three or five seconds). In some implementations, the difference between the forces is an instantaneous difference (e.g., a 'snapshot'). In some implementations, a first time-averaged difference is comparted to a first threshold 124, and a second snapshot difference is comparted to a second threshold 124.

At ACT 410 the method 400 can include a determination, by the data processing system 100, of an adjustment to a vertical thrust. The adjustment can be an adjustment to a rotor 328 or propeller 326 configured to reduce the difference. For example, the data processing system 100 can adjust the speed or blade pitch of the rotor 328 to adjust the force at one or more ground contact points upward or downward. The data processing system 100 can effect the adjustment to the vertical thrust by adjusting a total thrust having a vertical component, or by adjusting (e.g., via a swashplate effector) a proportion of vertical thrust and horizontal thrust. Thus, the adjustment to the vertical thrust can adjust horizontal thrust. The adjustment can reduce a difference between forces, such as to equalize the forces between a right and left skid or pontoon, or otherwise reduce an absolute or offset difference between forces corresponding to the various ground contact points.

At ACT 415 the method 400 can include a generation, by the data processing system 100, of a control output 308 to reduce the differential between the contact points. The control output 308 can include various aerodynamic or other control surfaces 310. For example, the control output 308 can include control signals configured to actuate effectors for control surfaces 310 for aerodynamic control surfaces 310 (e.g., rotational airfoils such as rotors 328 or propellers 326), or other control surfaces 310, such as frictional surfaces of braking elements configured to couple with wheels of the aerial vehicle 200 (e.g., wheel-brakes 330).

Figure 5:
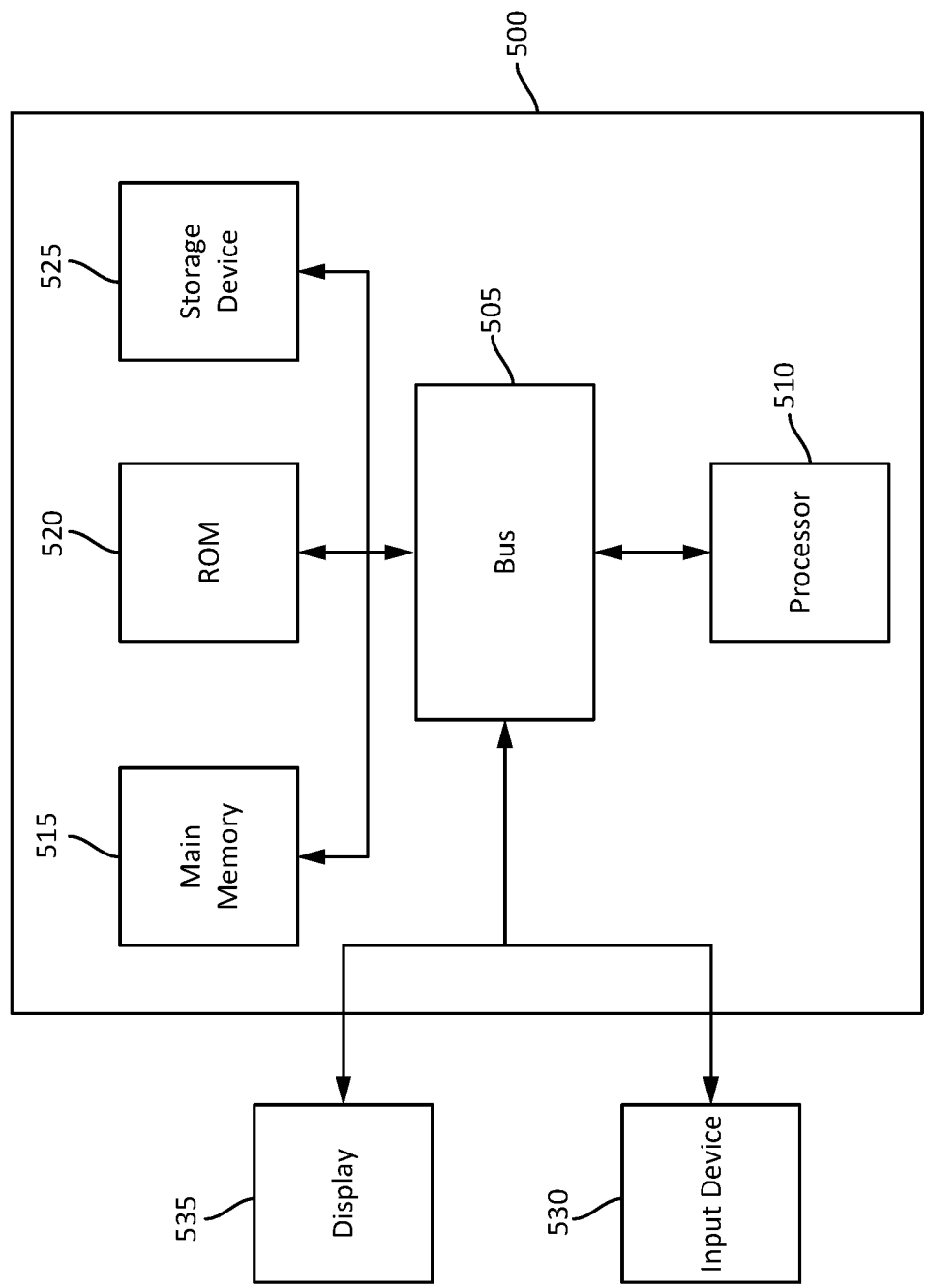
FIG. 5 illustrates a block diagram of an example computer system useful in implementing one or more components detailed herein.

FIG. 5 illustrates a block diagram of an example computer system 500. The computer system or computing device 500 can include or be used to implement the data processing system 100, or its components. The computing system 500 includes at least one bus 505 or other communication component for communicating information and at least one processor 510 or processing circuit coupled to the bus 505 for processing information. The computing system 500 can also include one or more processors 510 or processing circuits coupled to the bus 505 for processing information. The computing system 500 also includes at least one main memory 515, such as a random-access memory (RAM) or other dynamic storage device, coupled to the bus 505 for storing information, and instructions to be executed by the processor 510. The computing system 500 can further include at least one read only memory (ROM) 520 or other static storage device coupled to the bus 505 for storing static information and instructions for the processor 510. A storage device 525, such as a solid-state device, magnetic disk, or optical disk, can be coupled to the bus 505 to persistently store information and instructions.

The computing system 500 can be coupled via the bus 505 to a display 535, such as a liquid crystal display, or active-matrix display, for displaying information to a user such as an administrator of the data processing system 100 (e.g., a pilot). An input device 530, such as a keyboard or voice interface can be coupled to the bus 505 for communicating information and commands to the processor 510. The input device 530 can include a touch screen display 535. The input device 530 can also include a cursor control, such as a mouse, a trackball, or cursor direction keys, for communicating direction information and command selections to the processor 510 and for controlling cursor movement on the display 535. The display 535 can be part of the display devices 535, or other components of FIG. 5.

The processes, systems, and methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 can cause the computing system 500 to perform the illustrative processes described herein. One or more processors in a multi-processing arrangement can also be employed to execute the instructions contained in main memory 515. Hard-wired circuitry can be used in place of or in combination with software instructions together with the systems and methods described herein. Systems and methods described herein are not limited to any specific combination of hardware circuitry and software.

Although an example computing system has been described in FIG. 5, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components and illustrates one grouping of operations and responsibilities of these system components. Other groupings that execute similar overall operations are understood to be within the scope of the present application. Modules can be implemented in hardware or as computer instructions on a non-transient computer readable storage medium, and modules can be distributed across various hardware- or computer-based components.

The systems described above can provide multiple ones of any or each of those components, and these components can be provided on either a standalone system or on multiple instantiations in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors 102 providing any value determined herein, sensors 102 providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively, or in addition, the program instructions can be encoded on an artificially generated propagated signal, e.g., a machine-generated electrical, optical, or electromagnetic signal that is generated to encode information for transmission to a suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device," "component," or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array), a GPU, or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services and/or distributed computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array), a GPU, or an ASIC (application specific integrated circuit). Devices suitable for storing computer program instructions and data can include non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements, and features discussed in connection with one implementation are not intended to be excluded from a similar role in other implementations or implementations.

The phraseology and terminology used herein is for the purpose of description and should not be regarded as limiting. The use of "including," "comprising," "having," "containing," "involving," "characterized by," "characterized in that," and variations thereof herein is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

References to "or" can be construed as inclusive so that any terms described using "or" can indicate any of a single, more than one, and all of the described terms. For example, a reference to "at least one of 'A' and 'B'" can include only "A," only "B," as well as both "A" and "B." Such references used in conjunction with "comprising" or other open terminology can include additional items.

Where technical features in the drawings, detailed description or any claims are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, and orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes, and omissions can also be made in the design, operating conditions and arrangement of the disclosed elements and operations without departing from the scope of the present disclosure.

The systems and methods described herein can be embodied in other specific forms without departing from the characteristics thereof. Scope of the systems and methods described herein is thus indicated by the appended claims, rather than the foregoing description, and changes that come within the meaning and range of equivalency of the claims are embraced therein.

While this specification contains many specific implementation details, these should not be construed as limitations on the scope of any inventions or of what can be claimed, but rather as descriptions of features specific to particular embodiments of particular aspects. Certain features described in this specification in the context of separate embodiments can also be implemented in combination in a single embodiment. Conversely, various features described in the context of a single embodiment can also be implemented in multiple embodiments separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated in a single software product or packaged into multiple software products.

Thus, particular embodiments of the subject matter have been described. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A system, comprising:
one or more processors, coupled with memory, to:
    detect a difference between forces applied to a plurality of ground contact points of an aerial vehicle taxiing on a ground surface;
    determine an adjustment to a vertical component of a thrust produced by at least one of a rotor or a propeller of the aerial vehicle to reduce the difference between the forces applied to the plurality of ground contact points of the aerial vehicle; and
    generate a control output to cause the at least one of the rotor or the propeller to adjust the vertical component of the thrust to reduce the difference between the forces.

2. The system of claim 1, further comprising:
a sensor configured to measure a force for each of the plurality of ground contact points; and
comprising the one or more processors to:
    detect the difference between the forces applied to the plurality of ground contact points based on the sensor measurements.

3. The system of claim 1, further comprising:
a wind speed sensor configured to determine a wind speed; and
comprising the one or more processors to:
    determine the control output based on the wind speed.

4. The system of claim 1, comprising the one or more processors to:
receive a control input corresponding to at least one of the rotor or the propeller; and
generate the control output based on the control input.

5. The system of claim 1, comprising the one or more processors to:
receive a control input comprising a velocity reference or an acceleration reference, the control input corresponding to at least one of the rotor or the propeller; and
generate the control output based on the control input.

6. The system of claim 1, comprising the one or more processors to:
   receive, from an autonomous flight control system, a control input corresponding to at least one of the rotor or the propeller; and
   generate the control output based on the control input.

7. The system of claim 1, wherein the one or more processors are configured to:
   receive a control input corresponding to at least one of the rotor or the propeller;
   determine an instruction or command to lift-off based on the control input; and
   generate, responsive to the determination of the instruction or command to lift-off, the control output to cause the aerial vehicle to lift-off.

8. The system of claim 1, comprising the one or more processors to:
   receive a control input comprising a wheel-brake engagement command to brake a wheel of one or more of the plurality of ground contact points; and
   generate the control output responsive to the receipt of the wheel-brake engagement command, the control output to adjust a velocity reference or an acceleration reference for the aerial vehicle,
   wherein the adjustment to the vertical component of the thrust is determined based on the wheel brake command.

9. The system of claim 1, comprising the one or more processors to:
   determine an adjustment to a horizontal component of the thrust produced by at least one of the rotor or the propeller of the aerial vehicle, while taxiing on the ground surface, to reduce the difference between at least one of:
   a velocity of the aerial vehicle and a velocity reference; or
   an acceleration of the aerial vehicle and an acceleration reference.

10. The system of claim 1, comprising the one or more processors to:
    generate the control output comprising:
    a first control signal configured to actuate a first effector for a first rotational airfoil; and
    a second control signal configured to actuate a second effector for a second rotational airfoil, the first rotational airfoil or second rotational airfoil comprising the propeller or the rotor.

11. A method comprising:
    detecting a difference between forces applied to a plurality of ground contact points of an aerial vehicle taxiing on a ground surface;
    determining an adjustment to a vertical component of a thrust produced by at least one of a rotor or a propeller of the aerial vehicle to reduce the difference between the forces applied to the plurality of ground contact points of the aerial vehicle;
    receiving a control input corresponding to at least one of the rotor or the propeller, the control input comprising a velocity reference or an acceleration reference; and
    generating, based on the control input, a control output to cause the at least one of the rotor or the propeller to adjust the vertical component of the thrust to reduce the difference between the forces.

12. The method of claim 11, comprising:
    receiving, from an autonomous flight control system, a control input corresponding to at least one of the rotor or the propeller; and
    generating the control output based on the control input.

13. The method of claim 11, comprising:
    receiving, from a human-machine interface of the aerial vehicle, a control input corresponding to at least one of the rotor or the propeller; and
    generating the control output based on the control input.

14. The method of claim 11, comprising:
    receiving a control input corresponding to at least one of the rotor or the propeller;
    determining that the control input is indicative of an instruction or command to lift-off; and
    generating the control output to cause the aerial vehicle to lift-off, responsive to the determination that the control input is indicative of the instruction or command to lift-off.

15. The method of claim 11, comprising:
    receiving a control input comprising a wheel-brake engagement command to brake a wheel of one or more of the plurality of ground contact points; and
    generating the control output based on the control input and responsive to the receipt of the wheel-brake engagement command, the control output to adjust a velocity reference or an acceleration reference for the aerial vehicle,
    wherein the adjustment to the vertical component of the thrust is determined based on the wheel brake command.

16. An aerial vehicle comprising:
    a plurality of ground contact points;
    at least one of a rotor or a propeller configured to generate a thrust; and
    one or more processors, coupled with memory, to:
    detect a difference between forces applied to the plurality of ground contact points of the aerial vehicle taxiing on a ground surface;
    determine an adjustment to a vertical component of the thrust to reduce the difference between the forces applied to the plurality of ground contact points of the aerial vehicle; and
    generate a control output to cause the at least one of the rotor or the propeller to adjust the vertical component of the thrust to reduce the difference between the forces.

17. The aerial vehicle of claim 16, comprising the one or more processors to:
    receive a control input corresponding to at least one of the rotor or the propeller; and
    generate the control output based on the control input.

18. The aerial vehicle of claim 16, comprising the one or more processors to:
    receive a control input comprising a velocity reference or an acceleration reference; and
    generate the control output based on the control input.

19. The aerial vehicle of claim 16, comprising:
    a wind speed sensor configured to determine a wind speed; and
    comprising the one or more processors to determine the control output based on the wind speed.

\* \* \* \* \*